June 20, 1961  G. LOWE  2,989,675
SAFETY BRAKE FOR POWER TOOL
Filed April 30, 1959
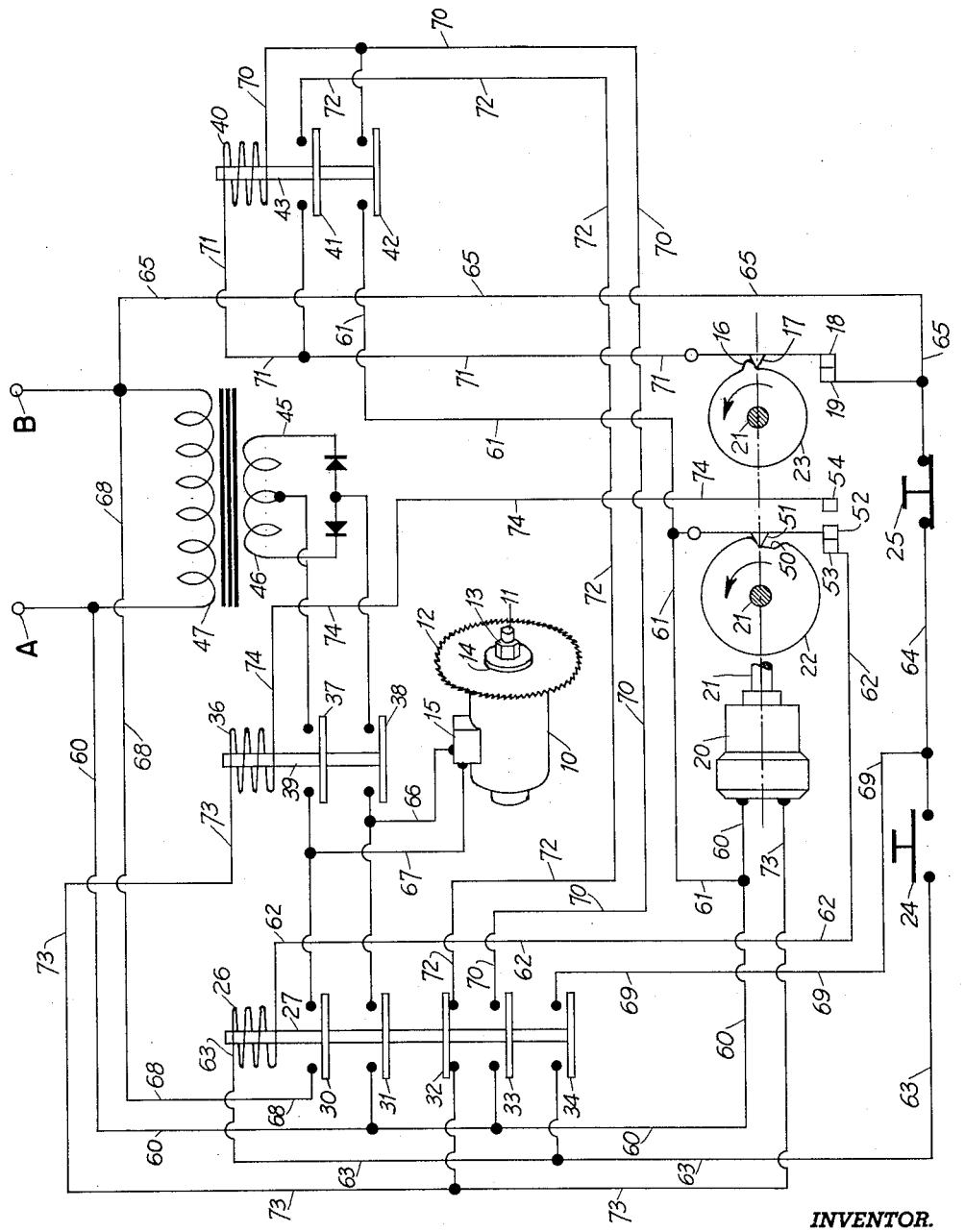
INVENTOR.
GEORGE LOWE
BY
*Bradley Cohn*
ATTORNEY

United States Patent Office 2,989,675
Patented June 20, 1961

2,989,675
SAFETY BRAKE FOR POWER TOOL
George Lowe, Lancaster, Pa., assignor, by mesne assignments, to De Walt, Inc., a corporation of Delaware
Filed Apr. 30, 1959, Ser. No. 810,100
5 Claims. (Cl. 318—212)

This invention relates in general to braking electric motors and more particularly to applying a D.C. current to an A.C. motor. It is particularly useful where such motors are used to operate a power tool.

Electric power saws and other rotary power tools may drive their blades at 3600 r.p.m. Some applications may even require higher speeds. When such a tool is merely switched off, the inertia of the blade and the rotating motor parts will keep it spinning for several minutes. This presents a great danger hazard because, as the blade slows down, it rotates silently without vibration. The operator, several minutes after switching off the saw and without knowing the blade is still rotating, may allow a workpiece, a portion of his anatomy, or his clothing to contact the spinning blade with disastrous results. For these reasons, many attempts have been made to develop a satisfactory brake for rotary power tools.

One method which has been developed to rapidly reduce the speed and bring to a stop the blade of a power saw has been to apply a direct current to windings or the field coils of an A.C. motor. Since the field coils have a much lower resistance to the D.C. current than they do to the A.C. current, a low voltage D.C. current is applied. Other methods have applied mechanical brakes to the motor shaft, the saw blade, or to other elements. Since rotary saw blades or other rotary tool elements are usually held on a threaded, rotating shaft by a nut, a too sudden stopping of the shaft or the motor will produce a dangerous condition in that the tool will tend to rotate relative to the shaft to unscrew the nut and fly off. Also, the immediate application of a strong braking action, whether by mechanical means or by the application of D.C. to the field coils, will cause an intense vibration of a rapidly rotating saw blade. This vibration increased the danger of the blade working free of the shaft.

An object of this invention is to provide a brake for an electric power tool which effectively stops the rotation of the moving parts of the tool in the fastest possible time while not causing excessive vibration or giving rise to the danger of the cutting tool working loose from the shaft.

Another object of this invention is to allow the higher air or other frictional resistance at high speeds to cause an initial rapid deceleration of the blade of a power saw before applying a brake.

Still another object of this invention is to provide simple, effective, rugged, and foolproof electrical components and their associated circuitry to apply a braking action for a given period of time to an electric power tool after the lapse of a short period of time.

Yet another object of this invention is to provide for the more effective braking of an alternating current power tool by making it possible to safely apply a higher direct current to the field coils of the alternating current power tool.

A feature of this invention is the provision, in a power tool, of a low speed timing motor which rotates two cam disks on a single shaft. This timing motor is activated, when the power tool is shut off, to start a braking action for a given period of time after a short lapse of time. Electrical components and associated circuitry prevent the power tool from being restarted while the braking action is being applied. When the braking action is completed after a set period of time, the timing motor has made a single revolution and shuts itself off.

Additional objects, advantages, and features of invention reside in the construction, arrangement, and combination of parts involved in the embodiment of the invention and its practice otherwise as will be understood from the following description and the accompanying drawing.

The drawing shows a schematic diagram of an embodiment of the invention applied to an A.C. power saw.

Referring to the drawing in detail, the numeral 10 designates an alternating current electric motor which drives the shaft 11 on which is secured the saw blade 12. The blade 12 is held on the shaft 11 by means of the nut 13 which clamps the blade 12 in place with the washer 14. This motor and saw blade could be used in a commercial over arm saw, a table saw, a portable electric saw, or the like.

The numeral 20 designates the electrically driven timing motor which is small enough to fit within the outlet box 15 of the motor 10 or within a separate switch box which is used to activate the power tool. This timing motor operates on A.C. line current and should turn its shaft about one revolution per minute. Mounted on this shaft 21 are the cam disks 22 and 23 shown in full views in this schematic drawing. When the timing motor 20 starts, it rotates the two cam disks 22 and 23 counter-clockwise as shown by the arrows. In its rest position as illustrated in the drawing, the cam disk 22 has extending into its cut out portion 50 the cam follower 51 which is carried on the break and make contact 52. While the cam follower 51 is within the cut out portion 50 the contact 52 closes a circuit with the point 53 and, when the disk 22 rotates enough so that the cam follower 51 rides up out of the cut out portion 50, the contact 52 breaks contact with the point 53 and then makes contact with the point 54. The cam disk 23 has a single small protrusion 16 which moves the cam follower 17 outward to break the circuit between the contact 18 and the point 19.

The start button switch 24 is normally open and is only closed when pushed, while the stop button switch 25 is closed and is only opened when pushed. 26 designates a solenoid which, by means of the rod 27, operates the switches 30, 31, 32, 33 and 34. The solenoid 36 operates the switches 37 and 38 by means of the rod 39. In a like manner, the solenoid 40 operates the switches 41 and 42 by means of the rod 43. A center tap rectifier 45 operates from the secondary coil 46 of the transformer 47.

An alternating current power source is connected to the terminals A and B. When the start button 24 is depressed, it closes a circuit from terminal A through line 60 past the open swtiches 31 and 33 to line 61. Line 61, through the make and break contact 52 and the point 53, is then connected to line 62 which leads to the coil of the solenoid 26. Extending from the coil of the solenoid 26 is the line 63 which passes the open switch 34 to be connected to the depressed and closed start button 24. Line 64 runs to the normally closed stop button 25 from which line 65 extends to terminal B. Thus, when the start button 24 is depressed, an alternating current from the terminals A and B energizes the coil of the solenoid 26 to activate the rod 27 and close the switches 30, 31, 33 and 34. When the switches 30 and 31 close, current flows from terminal A through line 60 and switch 31 to line 66 and the motor 10. Line 67 leads from the motor 10 to switch 30 and line 68 which is connected to terminal B. Thus the closing of the switches 30 and 31 directs current from the terminals A and B to the motor 10 to run it. When the start button 24 is released, current from line 63 bypasses the open start button 24 by flowing through the now closed switch 34 and the line 69. Thus switch 34 closes a holddown circuit which keeps the solenoid 26 activated after the start button 24 is released.

When the switch 33 is closed by the solenoid 26, current from terminal A flows from line 60 and switch 33 to line 70 which extends to the coil of the solenoid 40. Line 71 extends from solenoid 40 to the contact 18 which is closed to allow current to flow to the point 19 and then through line 65 to terminal B. Switch 33 thus activates the solenoid 40 which closes the switches 41 and 42. Relay 36 is not yet activated so that switches 37 and 38 are open. Switch 32 is also open while the relay 26 is activated. Therefore, while the motor 10 is running, all the relay operated switches are closed except switches 32, 37 and 38.

When it is desired to stop the motor 10, the stop button 25 is pushed which breaks the circuit to the solenoid 26 allowing switches 30, 31, 33 and 34 to fall open and switch 32 to close. Solenoid 40, however, remains activated as current from terminal B flows through line 65, point 19, contact 18, and line 71 to it, and current from terminal A flows along line 60 to line 61 through switch 42 to solenoid 40. Therefore, it can be seen that switch 42 keeps solenoid 40 activated after the stop button 25 disconnects and drops out solenoid 26.

As switch 32 closes, current from terminal A flows through line 60 to the timing motor 20. Line 73 extends from the timing motor to the now closed switch 32 to line 72 which leads to the closed switch 41 and then to terminal B through line 71, the contact 18, the point 19, and line 65. Therefore the closing of switch 32, when switch 41 is also closed, activates the timing motor 20.

As the timing motor 20 turns, from one to five seconds may elapse before the cam follower 51 rides up out of the cutout portion 50 of the cam disk 22. This short time delay, which is determined by the speed of rotation of the timing motor 20 and the size of the cutout portion 50, is an essential feature of my invention that allows many resulting advantages. For example, if the saw blade 12 is turning at 3600 r.p.m., its air resistance alone would be on the order of four times its air resistance at 1800 r.p.m. if it follows the usual resistance squared law. For reasons of this nature the greatest deceleration of the blade by frictional forces takes place in the first few seconds. If a strong braking action is applied immediately to the shaft 11 as soon as the motor 10 is turned off, the shock of the sudden deceleration tends to set up violent vibrations which may cause the shaft to throw the blade. If the braking system used applies a direct current to the field coils, a weaker direct current must be applied to avoid this danger. However, after the lapse of a few seconds, a much stronger direct current braking current can be applied. This stronger braking current, even though applied after the lapse of a few seconds, may stop a saw in a shorter total period of time, allowing a greater safety factor, as would the immediate application of the weaker braking current. In addition, making possible the application of a stronger direct current for the braking of the motor may result in the use of a less expensive transformer 47 as the current may be applied at a higher voltage. The less the alternating line current is stepped down by the transformer 47 before being rectified, the cheaper the transformer may be. The time delay which gives rise to the optimum advantage has been found to be about two seconds for one industrial A.C. motor driven tool.

When the cam follower 51 rides up out of the cutout portion 50 of the disk 22 after the time interval has elapsed, the contact 52 breaks its connection with the point 53 and makes a connection with the point 54. Current then flows from terminal A through line 60 to line 61 and contact 52. Then from point 54 current flows along line 74, through the coil of the solenoid 36, through line 73, the closed switch 32, line 72, the closed switch 41, the line 71, the contact 18, the point 19 and line 65 to terminal B. Thus the solenoid 36 is activated to close the switches 37 and 38. These switches send a direct current from the center tap rectifier 45 into the motor 10 through the leads 66 and 67. This direct current causes a braking action for 20–25 seconds while the cam disk 23 completes a revolution. The protrusion 16 moves the contact 18 away from the point 19 to open the circuit to the solenoid 40. The switches 41 and 42 fall open to break the circuit to the solenoid 36 so that the direct current braking current is cut off. As switch 41 opens, it disconnects the timing motor 20. When the timing motor is cut off, it coasts a few degrees with the inertia of its geared down armature so that the protrusion 16 passes the follower 17 to allow the contact 18 to touch the point 19. Also, as the follower 51 rides into the cutout portion 50, the contact 52 falls away from the point 54 into contact with the point 53. The braking cycle is then complete and the components are all again in the positions shown in the drawing.

An added advantage of this invention results from the fact that the start button 24 will not energize the solenoid 26 while the contact 52 is not touching the point 53. Thus, once the actual braking cycle has started, it must complete its course before the saw motor can be re-started. This proves to be a considerable safety factor in some applications.

While I have disclosed my invention with particularity in one form known to me, it will nevertheless be understood that this is purely exemplary and that modifications in the construction, arrangement, and combination of parts, substitutions of equivalents mechanically, electrically, and otherwise, may be made without departing from the spirit of the invention, except as it may be more particularly limited in the appended claims wherein I claim:

1. A brake for a power tool having an alternating current motor with field coils, said brake comprising, in combination, a first solenoid, a normally closed switch opened by said first solenoid, normally open switches closed by said first solenoid, one of said switches closed by said first solenoid directing an alternating current to run said alternating current motor, a second solenoid activated by one of said switches closed by said first solenoid, normally open switches closed by said second solenoid, one of said switches closed by said second solenoid keeping said second solenoid activated after said first solenoid is disconnected, a third solenoid, at least one normally open switch closed by said third solenoid, timing means activated by one of said switches closed by said second solenoid in series with said normally closed switch opened by said first solenoid when it is activated, said timing means activating said third solenoid after a short delay for a period of time and then disconnecting said third solenoid and said second solenoid, and a direct current source connected to the field coils of said alternating current motor by said switch closed by said third solenoid.

2. A brake for a power tool having an alternating current motor with field coils, said brake comprising, in combination, means to start and stop said alternating current motor, a first solenoid activated by said means to start and stop said motor and disconnected by said means to start and stop said motor, a normally closed switch opened by said first solenoid, normally open switches closed by said first solenoid at least one of which directs an alternating current to said motor, a second solenoid activated by one of said switches closed by said first solenoid, normally open switches closed by said second solenoid, a third solenoid, at least one normally open switch closed by said third solenoid, a timing motor turned on by one of said switches closed by said second solenoid in series with said normally closed switch opened when said first solenoid is activated, a first contact activating said third solenoid when closed, a first means associated with said timing motor closing said first contact after a predetermined delay and then opening it after a period of time, a second contact through which said second solenoid is activated in series with one of said normally open switches closed by said second solenoid keeping said second solenoid activated after said first solenoid is disconnected, a second means associated with said timing motor to momentarily break said second contact, and a direct current source connected to the field coils of said alternating current motor by said switch closed by said third solenoid.

3. The combination according to claim 2 wherein said first contact consists of a first point, a second point, and a break and make contact, said first solenoid being activated through said break and make contact and said first point and said third solenoid being activated through said break and make contact and said second point; and wherein said first means associated with said timing motor after a delay moves said break and make contact from said first point to said second point for a period of time.

4. The combination according to claim 3 wherein said first means associated with said timing motor consists of a cam disk having a cutout portion on its edge and a first cam follower; and wherein said second means associated with said timing motor consists of a second cam disk with a protrusion from its edge and a second cam follower.

5. In combination with an electric motor, a source of supply of A.C. voltage, a source of D.C. voltage, first relay means connecting said motor to said A.C. source, second relay means energized upon activation of said first relay means, a self-holding circuit for said second relay means connected thereto and activated concurrently therewith, third relay means connected to said D.C. voltage source and operative when energized to connect said source to said motor, a timing device having energizing terminals serially connected to said first and second relay means, said timing device being operative in response to the successive activation and deactivation of said first relay means to activate said third relay means after a first predetermined time period has elapsed, whereby D.C. is applied to said motor after said motor is disconnected from said A.C. source, and then deactivate said self-holding circuit and said third relay means after a second time period has elapsed.

References Cited in the file of this patent

UNITED STATES PATENTS 2,503,438  Gruner _____ Apr. 11, 1950

FOREIGN PATENTS 888,901  France _____ Sept. 20, 1943
695,340  Germany _____ Aug. 22, 1940